(No Model.) 3 Sheets—Sheet 2.
G. M. RICHARDS.
AUTOMATIC FLUID PRESSURE FRICTION CLUTCH.

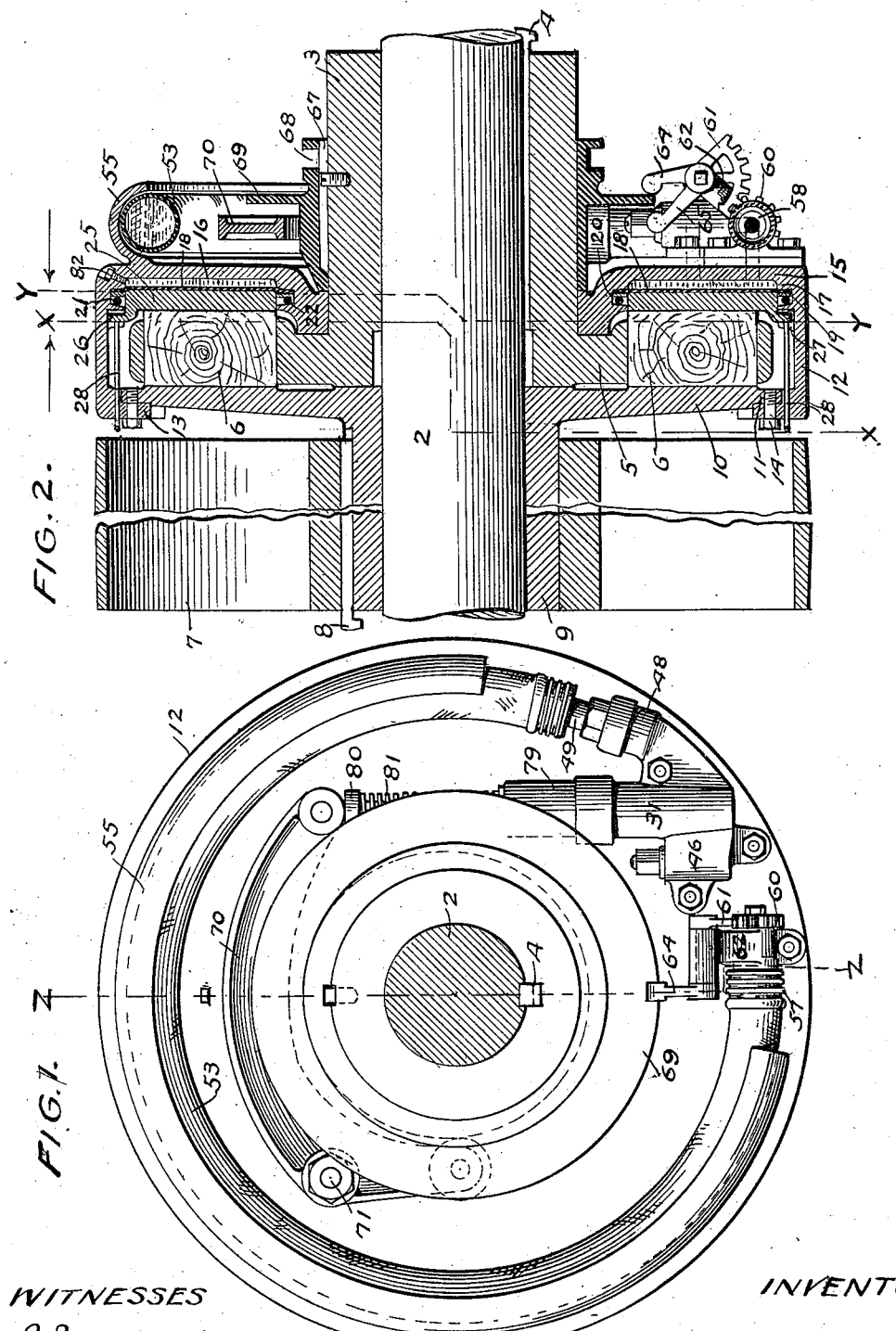

No. 574,823. Patented Jan. 5, 1897.

WITNESSES.
J. Jensen
H. S. Johnson

INVENTOR.
GEORGE M. RICHARDS.
BY T. D. Merwin atty.

THE NORRIS PETERS CO., PHOTO-LITHO., WASHINGTON, D. C.

(No Model.) 3 Sheets—Sheet 3.
G. M. RICHARDS.
AUTOMATIC FLUID PRESSURE FRICTION CLUTCH.
No. 574,823. Patented Jan. 5, 1897.
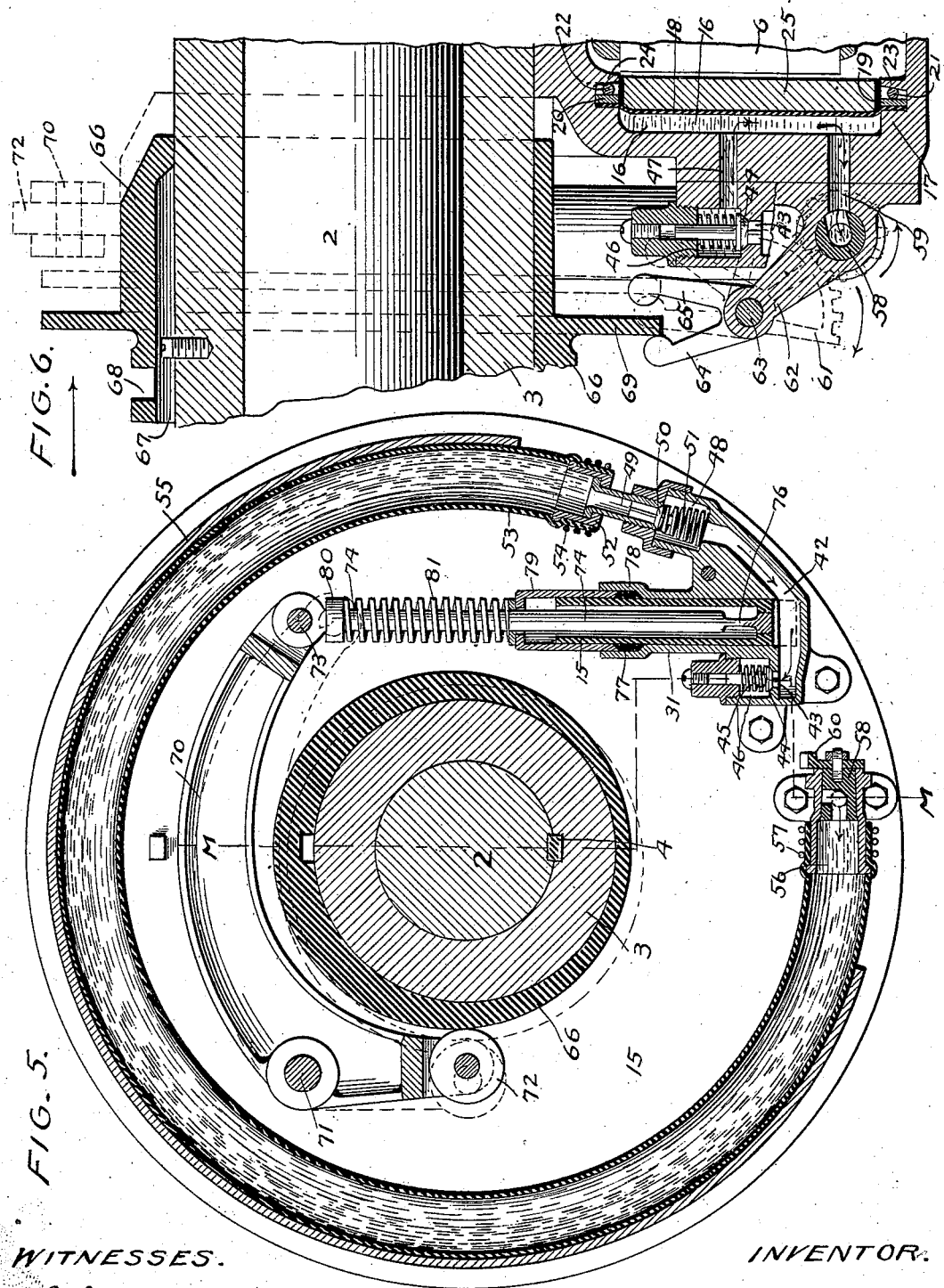
WITNESSES. INVENTOR.
GEORGE M. RICHARDS.

UNITED STATES PATENT OFFICE.

GEORGE M. RICHARDS, OF ERIE, PENNSYLVANIA.

AUTOMATIC FLUID-PRESSURE FRICTION-CLUTCH.

SPECIFICATION forming part of Letters Patent No. 574,823, dated January 5, 1897.

Application filed July 31, 1896. Serial No. 601,136. (No model.)

*To all whom it may concern:*

Be it known that I, GEORGE M. RICHARDS, of Erie, Erie county, Pennsylvania, have invented certain Improvements in Automatic Fluid-Pressure Friction-Clutches, of which the following is a specification.

My invention relates to improvements in fluid-pressure friction-clutches, its object being to provide means for applying pressure to produce requisite friction between the driving and driven elements automatically operative only when and so long as there is relative movement between said elements, either of said elements serving as the driver and rotating in either direction.

To this end my invention consists in providing the machine elements of the clutch mechanism with opposed friction pieces or surfaces, one of said pieces being relatively fixed and the other relatively movable to and from the same, as actuated by the applied pressure, and in providing the element which carries the relatively-movable friction-piece with an expansible fluid-chamber for actuating said friction-piece and an elastic fluid-reservoir and interposing between said chamber and reservoir a pump connected with both adapted to be actuated by engagement with the other machine element when and so long as there is relative movement between said elements.

My invention further consists in the features of construction hereinafter more particularly described and claimed.

Figure 4:
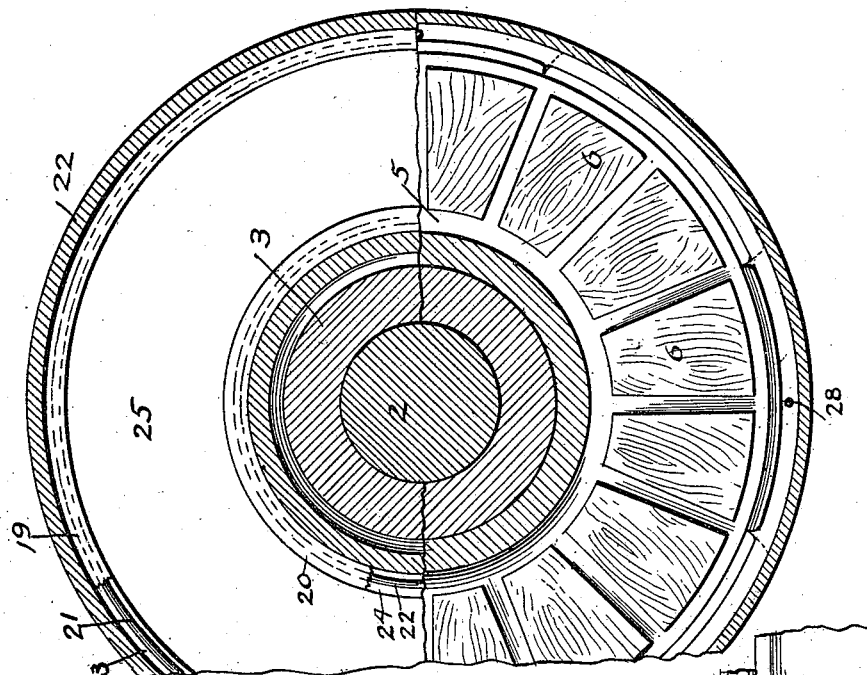
Figure 7:
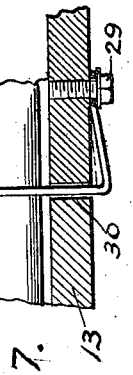
Figure 3:
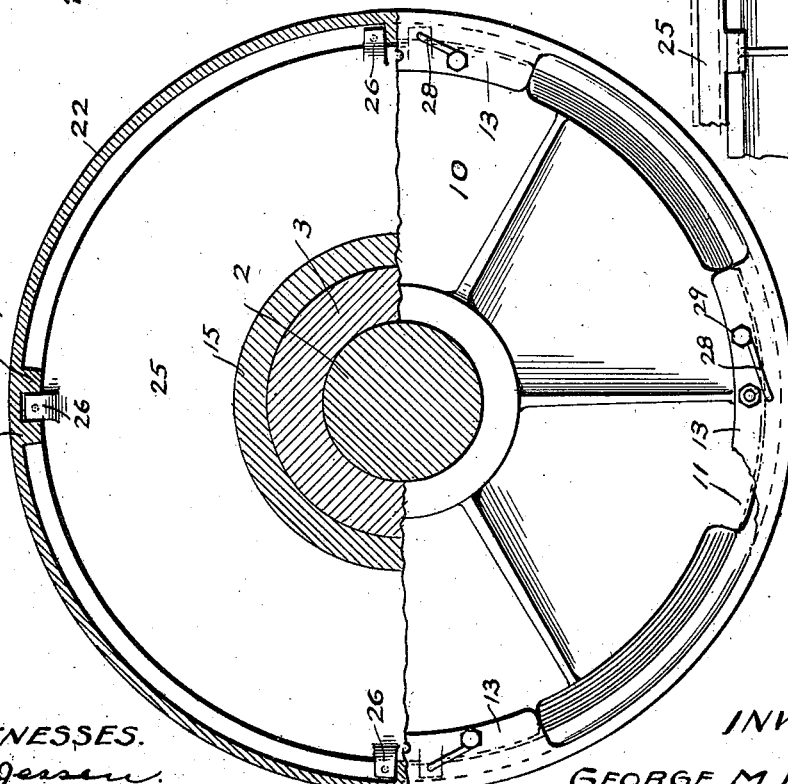

In the accompanying drawings, forming part of this specification, Figure 1 is an end elevation of my improved clutch, showing the pump and fluid-reservoir. Fig. 2 is a vertical longitudinal section of the same on line *z z* of Fig. 1, disclosing the fluid-pressure chamber, fluid-reservoir, friction-pieces, valve-actuating mechanism, and shifting sleeve. Fig. 3 is a cross-section on line *x x* of Fig. 2. Fig. 4 is a cross-section on line *y y* of Fig. 2. Fig. 5 is a detail cross-section through the fluid-reservoir, pump, and connected valves. Fig. 6 is a detail section on line *m m* of Fig. 5, and Fig. 7 is a detail of one of the springs for positively throwing out of engagement the friction-pieces of two clutch elements when pressure thereon has been removed.

As shown in the drawings, 2 represents the shaft; 3, the sleeve or hub secured thereon by the key 4. 5 is annular flange or frame having openings through its web to receive the friction-blocks 6. The pulley 7 is secured by the key 8 upon the hub 9, which is journaled loosely upon the shaft 2. This hub carries a shell inclosing the flange 5, made up of the annular flange 10, integral with the hub 9, and having peripheral projections 11.

The cylindrical part 12 has lips 13 to overlap the projections 11 when turned into contiguous position, the spaces between the lips being sufficient to permit the entry of the projections 11 when the parts are slipped into place, one part then being given a relative turn with reference to the other, so as to interlock the projections and lips. They are then secured together by means of the bolts 14. The cylindrical part 12 has an annular flange 15, provided on its inner face with a wide shallow annular channel 16 for the fluid-pressure chamber. Covering this channel to form said chamber and bearing upon the shoulder 17 is the flexible elastic diaphragm 18, the same being secured in place by means of the annular rings 19 and 20, held with sufficient pressure upon the diaphragm by means of the spring-wire rings 21 and 22, wedged between the rings 19 and 20 and the lips 23 and 24.

Upon the outside of the diaphragm is seated the annular friction-plate 25, which is provided with peripheral lugs 26, engaging inwardly-projecting lugs 27 upon the inside of the cylinder 12, whereby when in place said plate is prevented from rotative slip. The friction-plate is held normally thrust inward upon the diaphragm and away from the friction-blocks 6 by the spring 28, one end of each of which is secured on the outside of the lip 13 by means of the screw 29, the other end of the spring passing through an opening 30 in the lip and bearing upon the projection 26. The adjacent opposed face of the flange 23 and the friction-plate 25 are the bearing-surfaces for the opposite sides of the blocks 6, the blocks thus being clutched between these surfaces in the operation of the mechanism, as hereinafter described. The flange 15 is fitted to and turns upon the hub 3 as a bearing when the two parts of the clutch are running out of engagement. Mounted upon the flange 15 is the pump-cylinder 31, connecting with which is the fluid-passage 42. One end of the passage communicates with the port 43, which is closed by the valve 44, actuated by its spring 45. The valve-chamber 46 communicates through the port 47 with the fluid-pressure chamber 16. The other end of the passage 42 communicates with the valve-chamber 48, which has a port 49, closed by the valve 50 as actuated by its spring 51.

The port 49 communicates with the short cylinder or tube 52, to which is coupled the flexible hose 53 by means of the clamping-rings 54. The hose is arranged concentrically upon the flange 15, being held in place and protected by the shield 55. (See Fig. 1.) The other end of the hose is coupled to the short cylinder 56 by means of the clamping-rings 57.

Arranged in the cylinder 56 is the plug-valve 58, which controls communication between the hose and the port 59 leading to the pressure-chamber 16. The valve 58 is provided with a segmental pinion 60, engaged by the segmental gear 61, which has pivotal support upon the arm 62, secured to the disk 15. The opposite end of the pivot 63 of the segmental gear carries the fingers 64 and 65, by means of which the pivot may be turned so as to actuate the segmental gear, and thus open or close the valve 58.

66 is an eccentric shifting sleeve slidably mounted on the hub 3 and held from turning thereon by the feather 67. It is provided with an annular groove 68, with which any suitable operating mechanism may be connected. This sleeve has a circumferential rib 69, which extends between and is adapted to engage the fingers 64 and 65 and to turn the same as the sleeve is shifted. The pump-lever 70 is connected by the pivot 71 with the disk 15. The power end of the lever 70 carries an antifriction-roll 72, which rides upon the eccentric shifting sleeve 66 when the same is thrown into position to be engaged thereby.

To the other end of the lever is connected by the pivot 73 the piston-rod 74. The rod 74 extends into the cylindrical hollow piston 75, the inner dimensions of which are greater than the rod, and is screw-threaded into its head, the rod being flattened near its end at 76, so as to be slightly flexible to adapt itself to the arc of movement of the lever 70.

The piston 75 is fitted closely to the pump-cylinder, suitable packing 77 being fitted between the piston and the enlarged portion 78 of the cylinder. The sleeve 79, of the same inner dimensions as the main part of the pump-cylinder, is fitted into the enlarged end of the pump-cylinder, the end thereof being inwardly beveled, so as to press with a wedging action upon the packing. Interposed between the top of the sleeve 79 and the shoulder or collar 80 on the piston-rod is the coil-spring 81, which tends to crowd the sleeve 79 against the packing with a downward thrust of the pump-lever, so as to tighten the packing about the same, the pressure being slightly relieved with the reverse motion of the lever.

As clearly appears in Fig. 5, the pump is operated by the antifriction-roll 72, traveling over the periphery of the eccentric sleeve 66. Any suitable fluid may be used to furnish the required pressure, but I prefer some practically non-compressible and non-freezable liquid, such as a suitable oil, which is poured into the pressure-chamber by removing the screw-plug 82 until the chamber and the connected hose or reservoir are filled, the friction parts being out of engagement, it being essential that there shall be no air left in either the chamber, hose, or connected passages, these parts thus constituting a circulating system for the fluid.

The pulley and flanges 10 and 15 constitute the driving-machine element. The shaft, its flange 5, and blocks 6 constitute the driven element, and the friction-plate 25 and pressure-chamber constitute the friction device.

The clutch is operated as follows: Suppose the elements to be out of engagement, the shaft at rest, and the pulley turning loosely thereon. By any suitable means (not shown) the sleeve 66 is thrown inward or toward the clutch into the position shown in Fig. 2, its flange 69 engaging the finger 65, so as to turn the valve 58 and close communication between the pressure-chamber and the reservoir or hose. At the same time the sleeve is brought into engagement with the antifriction-roll 72 of the pump-lever 70. The driving element, made up of the pulley and the other described and connected parts, in its rotation carries the roll 72 around the eccentric sleeve, causing the pump to operate and to force the contents of the hose or reservoir into the pressure-chamber 16, expanding the same and carrying the friction-plate 25 into engagement with the blocks 6, at the same time forcing them against the flange 23. This pressure is increased by the operation of the pump and the pressure of the fluid in the pressure-chamber until the friction is sufficient to cause the flange 5 to be turned, and with it the shaft 2.

Should the load or the resistance to the turning of the shaft 2 be increased so as to cause slip between the two elements of the clutch, this slip or relative movement causes the pump to operate and force more of the contents of the hose into the pressure-chamber and increase the pressure and friction until the slipping is checked.

It will thus be seen that when the sleeve has been thrown into operative connection with the pump the pump is automatically started and continues to operate whenever and so long as there is any slip or relative movement between the two elements.

When it is desired to throw the elements out of engagement so as to stop the shaft, the sleeve is shifted in the opposite direction, carrying it out of engagement with the roll 72 and opening the valve 58, so as to stop the pump and allow the contents of the pressure-chamber to escape into the hose or reservoir. At the same time the pressure of the springs 30 serves to thrust the plate 25 away from the blocks 6 to hold them out of contact and prevent all friction between them.

I claim—

1. In a device of the class described, the combination with the driving and driven elements, of the interposed friction device, and automatic mechanism for operating said friction device mounted upon one element and engaged by the other element, whereby said mechanism is actuated whenever and so long as there is relative movement between said elements.

2. In a friction-clutch, the combination with the driving and driven elements, of the friction device, its automatic operating mechanism carried by one element and normally engaging the other element so as to be in action whenever and so long as there is relative movement between said elements, and means for throwing the said mechanism out of such engagement, and consequently out of action.

3. In a friction-clutch, the combination with the driving and driven elements, of automatic means for operating said clutch by creating frictional pressure between said elements, said means being carried by one element, and operatively engaged by the other.

4. In a friction-clutch, the combination with the driving and driven elements, of the pressure-creating mechanism carried by one of said elements and normally in operative engagement with the other and adapted to increase the pressure in proportion to the increase of load, and means independent of said mechanism for releasing said pressure.

5. In a friction-clutch, the combination with the driving and driven elements thereof, of a pressure-creating mechanism carried by one of said elements and automatically operated by the relative movement between said elements, and the pressure-releasing mechanism acting in opposition to said pressure-creating mechanism.

6. In a friction-clutch, the combination with the driving and driven elements, of mechanism carried by one element and normally in operative engagement with the other for creating frictional pressure between them in proportion to the load, and means for throwing said mechanism out of operative engagement.

7. In a fluid-pressure clutch, the combination with the two members thereof, of the interposed friction device, the mechanism for actuating said friction device mounted upon one of said members and adapted to be operatively engaged by the other member.

8. In a fluid-pressure clutch, the combination with the two elements or members thereof, of the interposed friction device, and automatic means for actuating said device while there is relative movement in either direction between said elements.

9. In a fluid-pressure clutch, the combination with the two elements thereof, either serving as the driver, of the interposed friction device, its operating mechanism, and automatic means for actuating said mechanism while and whenever there is relative movement in either direction between said elements.

10. In a fluid-pressure clutch, the combination with its members or elements, either adapted to serve as a driver, and the interposed expansible friction device, of the supply-pump, and means for automatically operating said pump while and whenever there is relative movement in either direction between said members.

11. In a fluid-pressure clutch, the combination with its members or elements, either adapted to serve as a driver, and the interposed friction device, of the supply-pump, the release-valve, means for automatically operating said pump while and whenever there is relative movement in either direction between said clutch members, and means for throwing said pump out of operation and for opening said valve.

12. In a fluid-pressure clutch, the combination with the members thereof, and the interposed expansible friction device, of the supply-pump, automatic means for actuating said pump only while there is relative movement between said clutch members, and means for holding said pump out of action.

13. The combination with a fluid-pressure clutch, of the supply-pump therefor carried by one member of the clutch, the pump-operating mechanism carried by the other member, the relief-valve, and the means for opening said relief-valve and for disengaging the pump and its operative means.

14. The combination with a fluid-pressure clutch, of the pump carried by one member, the cam carried by the other member for operating said pump in one direction, the spring for operating it in the other direction, and means for throwing said pump out of engagement with said operating device.

15. The combination with the fluid-pressure clutch, having a fluid-chamber interposed between its members, of the flexible diaphragm closing said chamber, the friction-plate actuated by the diaphragm, the supply-pump, and automatic means for actuating the pump only when there is relative movement of the clutch members.

16. The combination with the fluid-pressure clutch having a fluid-chamber interposed between its members, of the supply-pump, the relief-valve, automatic means for operating the pump during the relative movement of the clutch members, and means for operating the relief-valve and disengaging said pump from its operating mechanism.

17. The combination with the fluid-pressure clutch, of a supply-pump intermediate of the clutch members automatically operative while and whenever there is relative movement of the members, the relief-valve, and the shipping sleeve adapted to actuate said valve, and to set said pump in operation or throw it out of operation.

18. In a fluid-pressure clutch, the combination of a supply-pump carried by one of its members, a cam carried by the other member, the pump-actuating lever, the spring for holding said lever in engagement with said cam, the relief-valve, and the shipping sleeve for operating said relief-valve and for throwing said pump into or out of action.

19. In a friction-clutch, the combination with the driving and driven elements, of the mechanism mounted upon one element, and normally engaging the other for creating frictional pressure between said elements in proportion to the load on the clutch, and operative only when there is relative movement of said elements.

20. In a clutch of the class described, in combination the driving and driven elements, the fluid-pressure chamber, the collapsible fluid-reservoir, the pump for forcing the contents of said reservoir into the chamber, the relief-valve for permitting the return of the contents of the chamber into the reservoir, automatic means for actuating said pump while and so long as there is relative movement between said elements, and means for throwing said pump out of action and opening said relief-valve.

21. In a clutch of the class described, the combination with its elements, either serving as the driver, of the expansible fluid-pressure chamber, the collapsible fluid-reservoir, the pump connecting said reservoir with said chamber, and the relief-valve controlling the reflow from the chamber to the reservoir, all carried by one element, and the means carried by the other element for automatically actuating the pump during relative movement of the elements, and for mechanically throwing the pump out of action and opening the relief-valve.

22. In a clutch of the class described, the combination with the friction parts, of the fluid-circulating system carried by one clutch element or member, made up of an expansible pressure-chamber, a connected collapsible reservoir, suitable valve connections, a pump for forcing the fluid of the system into said chamber, means carried by the other element for automatically actuating said pump during relative movement of said elements, and means for mechanically stopping said pump and releasing the contents of said chamber.

23. In a clutch of the class described, in combination, the shaft, the circular flange carried thereby having openings through its web, the friction-blocks arranged in said openings, the pulley journaled on said shaft, the webs or flanges carried thereby, one adapted to bear upon one face of said friction-blocks, the other having an expansible chamber, the movable friction-plate upon the wall of said chamber adapted by its expansion to be brought into frictional engagement with the other face of said blocks, means for automatically expanding said chamber so long as there is relative movement between said shaft and pulley, and means for collapsing said chamber and separating the frictionally-bearing surfaces.

24. In a clutch of the class described, a fluid-circulating system, comprising an expansible fluid-pressure chamber, a collapsible fluid-reservoir, means for automatically forcing the contents of said reservoir into said chamber to actuate the clutch so long as there is relative movement between its members, and the means for throwing said automatic means out of action, and permitting the reflow of the contents of said chamber into said reservoir, and separating the frictionally-bearing surfaces.

25. In a clutch of the class described, the combination with the fluid-circulating system, of the pump connected therewith, the eccentric for actuating its piston in one direction, and the spring for actuating it in the reverse direction, said pump being made up of the cylinder, the cylindrical piston fitted thereto, the sleeve fitted upon said piston and serving as a seat for said spring, and the packing interposed between the cylinder and piston, and receiving the thrust of said sleeve.

26. In a pump, the combination of the cylinder having a cylindrical enlarged or socketed top, the cylindrical piston fitted to said cylinder, the packing arranged in the socket around said piston, the sleeve fitted to said piston and bearing upon said packing, and the retracting-spring bearing upon the top of said sleeve.

27. In a pump of the class described, in combination, the cylinder having a cylindrical enlarged top, the hollow cylindrical piston fitted to said cylinder, the piston-rod of less diameter than the opening in said piston extending into the same and secured in the head thereof, and flattened or cut away in a plane at right angles to the plane of the rod and pump-lever so as to accommodate it to the arc of movement of the lever, the packing arranged in the enlarged or socketed portion of said cylinder around said piston, the sleeve fitted to said piston and extending into the enlarged end of the cylinder and bearing upon said packing, the end of said sleeve being inwardly chamfered so as to wedge said packing against the piston, and the spring surrounding the piston-rod and seated upon said sleeve.

28. In a fluid-pressure clutch, the fluid-circulating system, comprising in combination the expansible pressure-chamber, the collapsible hose serving as a reservoir, the valve-controlled connection between each end thereof and said chamber, the means for forcing the contents of said hose into said chamber, and the means for permitting the partial return flow of the contents of the chamber into said hose.

29. In a fluid-pressure clutch, the combination with the fluid-pressure chamber, of the collapsible hose serving as a fluid-reservoir, the pump connecting one end of said hose with said chamber, and adapted to force its contents into said chamber, and the relief-valve connecting said chamber with the other end of said hose.

30. In a clutch of the class described, the combination with the driving and driven elements, of the fluid-circulating system made up of the expansible fluid-pressure chamber and the collapsible fluid-reservoir, the interposed pump for forcing the contents of the reservoir into the chamber, and the relief-valve for permitting the reflow of the contents of the chamber into the reservoir, the shipping sleeve for throwing the pump into action, the segmental pinion carried by the relief-valve, the segmental gear operatively engaging said pinion, and the flange upon said shipping sleeve for engaging said segmental gear so as to open and close its connected valve when slipped to throw said pump into or out of action.

In testimony whereof I affix my signature in presence of two witnesses.

GEORGE M. RICHARDS.

Witnesses:
T. D. MERWIN,
MINNIE L. THURWALD.